United States Patent [19]

Puskas

[11] Patent Number: 5,174,528
[45] Date of Patent: Dec. 29, 1992

[54] CRESCENT SHAPED RAM AIR PARACHUTE

[76] Inventor: Elek Puskas, Box 2464, R.D. 2, Mt. Holly, N.J. 08060

[21] Appl. No.: 797,982

[22] Filed: Nov. 26, 1991

[51] Int. Cl.⁵ .............................................. B64D 17/02
[52] U.S. Cl. .................................................. 244/145
[58] Field of Search ............... 244/142, 145, 146, 902, 244/36, 35 R

[56] References Cited

U.S. PATENT DOCUMENTS

| | | | |
|---|---|---|---|
| Re. 26,427 | 7/1968 | Jalbert | 244/142 |
| 1,175,595 | 3/1916 | Bruce | 244/35 R |
| 1,927,753 | 9/1933 | Porcello | 244/35 R |
| 3,524,613 | 4/1968 | Reuter et al. | 244/142 |
| 3,724,789 | 4/1973 | Snyder | 244/145 |
| 4,399,969 | 8/1983 | Gargano | 244/145 |
| 4,424,945 | 1/1984 | Dell | 244/13 |
| 4,705,238 | 11/1987 | Gargano | 244/145 |
| 4,708,078 | 11/1987 | Legaignoux et al. | 114/102 |
| 4,771,970 | 9/1988 | Sutton | 244/145 |
| 4,811,920 | 3/1989 | Askwith et al. | 244/145 |
| 4,934,630 | 6/1990 | Snyder | 244/13 |
| 5,069,404 | 12/1991 | Bouchard | 244/145 |

FOREIGN PATENT DOCUMENTS

| | | | |
|---|---|---|---|
| 2617798 | 1/1989 | France | 244/145 |
| 0016899 | 1/1991 | Japan | 244/902 |
| 2170156 | 7/1986 | United Kingdom | 244/145 |

OTHER PUBLICATIONS

Poynter, *The Parachute Manual*, p. 6.2.16, 1984.

Primary Examiner—Galen Barefoot
Attorney, Agent, or Firm—Fleit, Jacobson, Cohn, Price, Holman & Stern

[57] ABSTRACT

A ram air parachute has a crescent planform shape. A plurality of longitudinal ram air cells (14) are formed by spaced ribs (16) extending longitudinally between and connecting the upper surface (2) and lower surface (4) and have openings at the forward ends thereof adjacent the leading edge 8 to allow ram air to enter the cells when the parachute is deployed in use. A plurality of shroud lines (16) are connected to the loewr surface at spaced positions thereon. The leading edge has a shape substantially in the form of half the perimeter of a first ellipse and the trailing edge has a shape substantially in the form of half the perimeter of a second ellipse having the same major axis as the first ellipse but a shorter minor axis. The spacing between the ribs gradually decreases from the central to the outer regions of the canopy and the spacing between adjacent ribs is a function of the cosine of the sweep angle of the leading edge between adjacent ribs. The crescent shaped planform of the parachute canopy provides a reduction in induced drag and a large improvement in positive stability.

9 Claims, 3 Drawing Sheets

CRESCENT SHAPED RAM AIR PARACHUTE

BACKGROUND OF THE INVENTION

This invention relates to ram air parachutes, and more particularly to an improved ram air parachute canopy having a crescent shaped planform and rib spacing that varies from the central region of the parachute toward the side edges.

Ram air inflated air foil canopies for glide parachutes are well known and are constructed of upper and lower spaced flexible fabric surfaces connected by ribs or webs of flexible material extending longitudinally in the direction of flight when the parachute is deployed in use. The flexible upper and lower surfaces and ribs form collapsible elongated ram air cells usually extending from the leading edge to the trailing edge of the parachute. These cells are automatically opened and maintained open by ram air entering the cells through the leading edge, or more recently, adjacent the leading edge on the under surface of the canopy.

Early examples of such parachutes are shown in U.S. Pat. Nos. 3,724,789 (Snyder), RE 26,427 (Jalbert), and 3,524,613 (Reuter); and more recently, in U.S. Pat. Nos. 4,705,238 (Gargano), 4,708,078 (Legrignoux), 4,424,945 (Dell), 4,771,970 (Sutton), and 4,811,910 (Askwith). The teachings of these prior patents are incorporated herein by reference. It is well known that such prior art designs have induced drag and instability due to the rectangular planform shapes, uniformly shaped cells and uniformly spaced ribs across the width of the parachute.

BRIEF SUMMARY OF THE INVENTION

It is a primary object of this invention to provide a new parachute canopy construction of the ram air type that incorporates a crescent shaped planform.

It is a further object of this invention that both the leading edge and the trailing edge of the crescent shaped planform are elliptical in shape.

It is another object of this invention to provide a crescent shaped ram air parachute canopy in which the rib spacing or cell width decreases from the central portion toward the tip or edges of the canopy as a function of the leading edge sweep angle.

It is yet another object of this invention to provide a new parachute construction of the ram air inflated type which reduces induced drag and greatly improves positive stability, especially in high aspect ratio canopies.

It is a still further object of the invention to provide a ram air parachute design wherein the planform is a half-moon shape at one extreme and a very thin crescent at the other.

The above and other objects are achieved by the instant invention which provides a new ram air parachute design having a planform of a half-moon shape at one extreme and a very thin crescent at the other. In its preferred form, the leading edge is curved substantially in the shape of half of the perimeter of an ellipse and the trailing edge is half the perimeter of another ellipse having the same major axis as the first mentioned ellipse generating the leading edge curve, but having a much smaller minor axis. The major axis extends spanwise across the canopy and the minor axis extends longitudinally, i.e. in the direction of travel, of the canopy during flight.

In the present invention, the location of the ribs is a function of the curvature of the leading edge. More specifically, the function to locate the ribs is the cosine of the leading edge sweep angle with respect to the minor axis of the ellipse comprising the leading edge. This results in a higher density, or closer spacing, of the ribs in the outer edge region of the canopy than in the central region.

With these unique features, the planform of the parachute is approximately crescent shaped, and the density of the ribs (and therefore the ram air cells) increases as the leading edge curvature increases. The crescent shaped planform provides a reduction in induced drag and a large improvement in positive stability. Due to the tremendous increase in positive stability, much higher aspect ratio ram air wings can be built without the penalties normally associated with high aspect ratio construction. Furthermore, the higher aspect ratio design permits further reduction of the induced drag, and the canopy of the present invention thus results in superior glide performance.

BRIEF DESCRIPTION OF THE DRAWINGS

A preferred embodiment of the invention will now be described in detail with reference to the accompanying drawings wherein.

DETAILED DESCRIPTION OF THE PREFERRED EMBODIMENT

Figure 1:
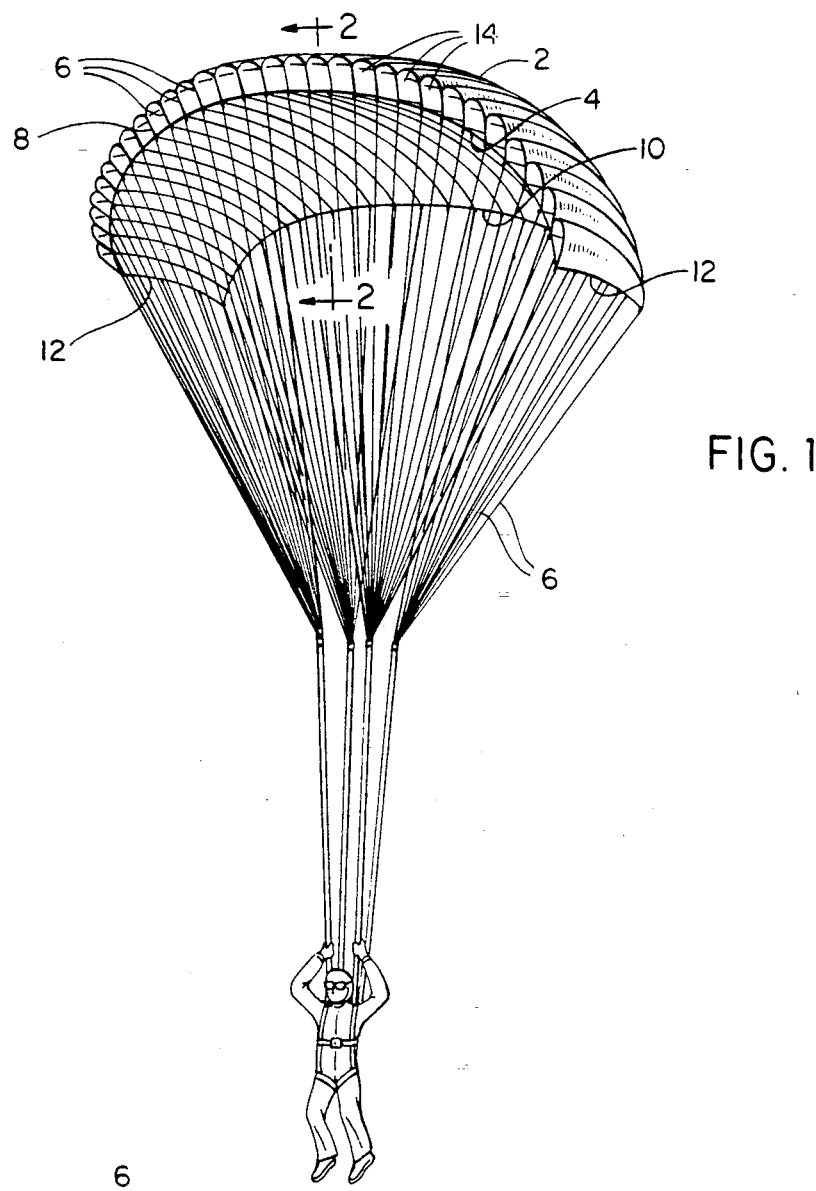
FIG. 1 is a perspective front view of a preferred parachute in accordance with this invention as deployed in use.

FIG. 1 shows the parachute canopy in the deployed position wherein the ram air cells are inflated and the arrangement of the shroud lines can be seen. The shroud lines are attached at spaced positions on the bottom surface of the parachute canopy at or adjacent the leading and trailing edges in any conventional manner known in the art, e.g. as shown in U.S. Pat. No. 3,724,789 to Snyder and U.S. Pat. No. RE 26,427 to Jalbert.

Figure 2:
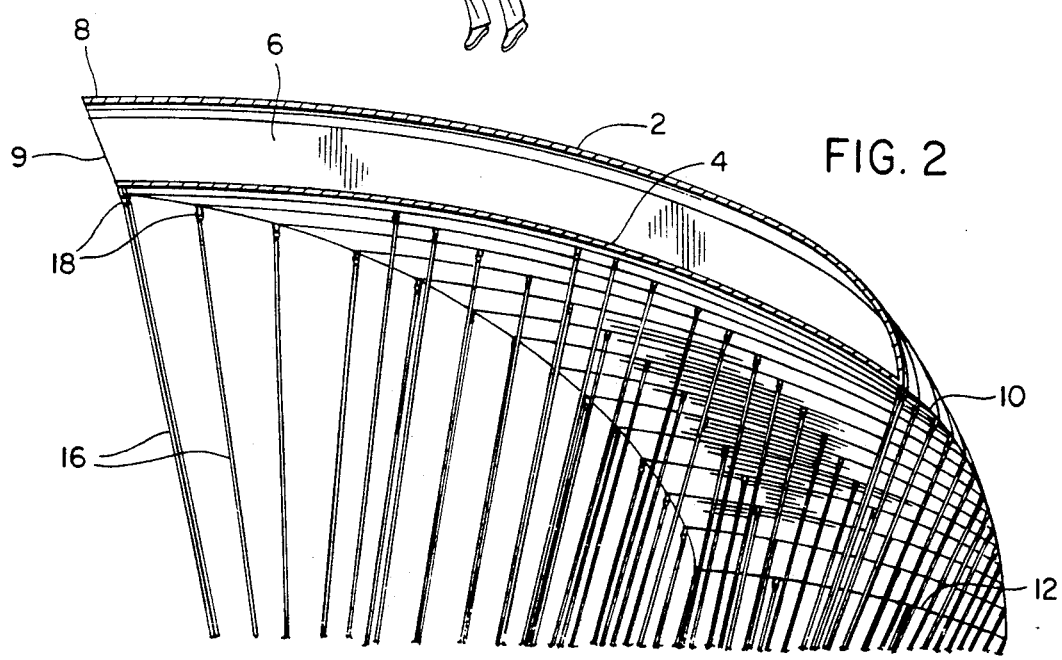
FIG. 2 is a cross-sectional perspective view taken along line 2—2 of FIG. 1.

The parachute of this invention as shown in FIGS. 1 and 2 is comprised of upper surface 2 and lower surface 4 spaced from each other, which may be flexible and made of conventional parachute material, for example. The upper and lower surfaces are connected together by ribs 6 which are also flexible and may be made of the same material as the upper and lower surfaces, extending longitudinally in the direction of flight of the parachute when deployed in use. The parachute canopy is thus divided into a series of longitudinally extending ram air cells.

While the leading edge of the canopy is shown open at 9 generally perpendicular to the oncoming flow, more recent designs position the leading edge opening at a much shallower angle or even rearward in the bottom surface. This positioning tends to reduce the drag of the leading edge and to provide better shaping in the critical leading edge area.

In the preferred embodiment, the leading edge 8 in plan view is curved to have a shape of approximately half the perimeter of a first ellipse and the trailing edge 10 is curved to have the shape of approximately half the perimeter of a second ellipse. The second ellipse of the trailing edge lies on a common major axis with the first ellipse (of the leading edge) but has a much smaller minor axis. Further, the elliptical shape of the leading edge causes the curvature of the leading edge to increase from the central region to the side regions of the canopy. Thus, the sweep angle of the leading edge with respect to the minor axis of the first ellipse increases from the center to the outer side regions of the canopy.

The location of the ribs with respect to each other, i.e. the spacing between the ribs, is determined as a function of the cosine of the leading edge sweep angle $\beta$ with respect to the minor axis whereby the rib spacing gradually decreases from the center to the outer edges of the parachute canopy. More particularly, the sweep angle $\beta$ comprises the angle between a line perpendicular to the minor axis and a line along the leading edge. Of course, if the leading edge is a curve, then the corresponding side of the angle would be the line tangent to the leading edge curve at or near the vertex of the angle. Thus, the distance X (see FIG. 3) representing the spacing between adjacent ribs is determined as a function of the cosine of angle $\beta$ so that X decreases as angle $\beta$ increases. The leading and trailing edges as shown in the drawings are not complete semi-elliptical curved surfaces of the respective ellipses, but are shortened at the ends and connected together by side edge pieces 12, which may, but not necessarily, extend parallel, or approximately parallel, to the minor axes in the embodiment shown. The end pieces 12 form the outer side edges of the canopy. Stabilizing panels well known in the art, may or may not be used as desired.

Shroud lines 16 are connected to the bottom surface 4 of the parachute canopy by any suitable means, as stated above, such as shown at 18, for example, and in the embodiment of FIG. 1 are shown as arranged in groups of four, although a different arrangement of the shroud or control lines might be used if desired. Alternatively, flares can be positioned at various locations along the bottom surface to provide smoother load transfer, such as shown in U.S. Pat. No. RE 26,427.

As shown in FIGS. 1 and 2, when the parachute is deployed in use the cells 14 between ribs 6, which have openings at or adjacent to the leading edge, are opened by ram air entering the cells at the forward ends thereof. The ram air maintains the cells in the open or inflated position during descent of the parachute in use. The direction and descent of the parachute is otherwise controlled by the shroud lines in the usual manner of operation of ram air parachutes, and therefore the general manner of operation of the parachute is not further described herein in detail.

It should be noted that the cells 14 are shown generally in the embodiment illustrated as extending the full chord length of the canopy and closed at the trailing edge 10. However, other trailing edge designs may be utilized, if desired, without departing from the scope of this invention. Also cross-over ports in the ribs and other openings in the fabric may be employed. For example, the trailing edge might not have zero thickness, but may have a thickness greater than zero, and perforations and/or vents may be provided in the trailing edge region. In addition, the trailing edge may not necessarily be plain, but may be shaped in some desired particular form, such as scalloped, serrated, or sawtoothed for example. Examples of such shapes are shown in FIGS. 4 and 5.

Figure 4:
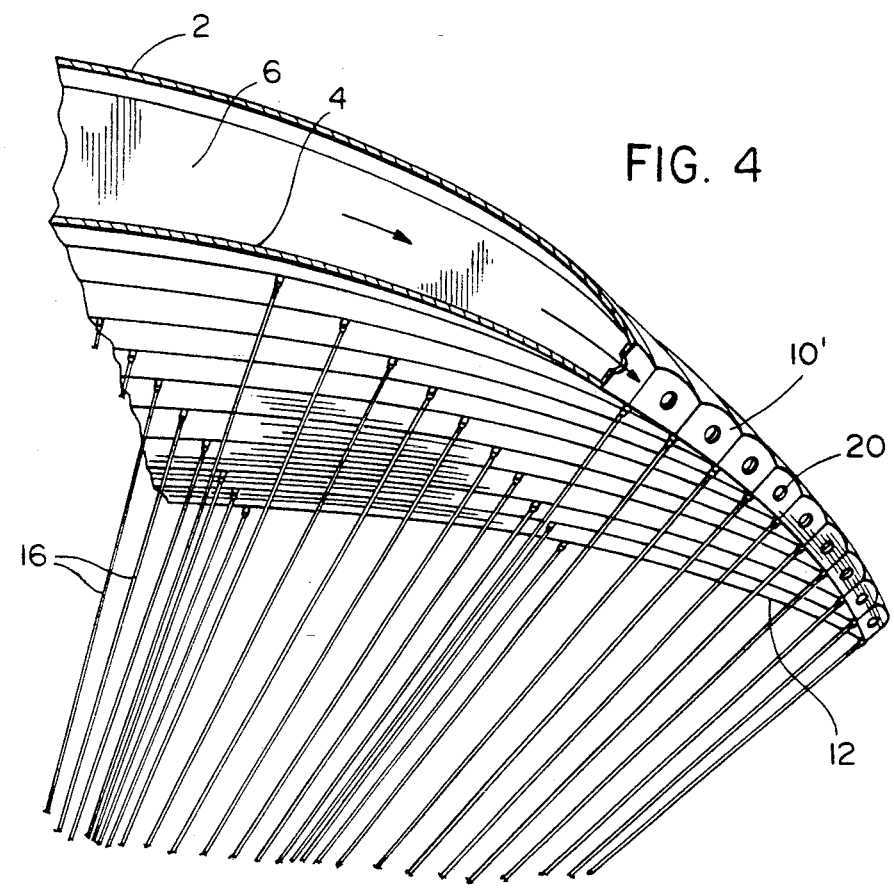
FIG. 4 is partial perspective view showing a modified embodiment wherein the trailing edge has thickness.
Figure 5:
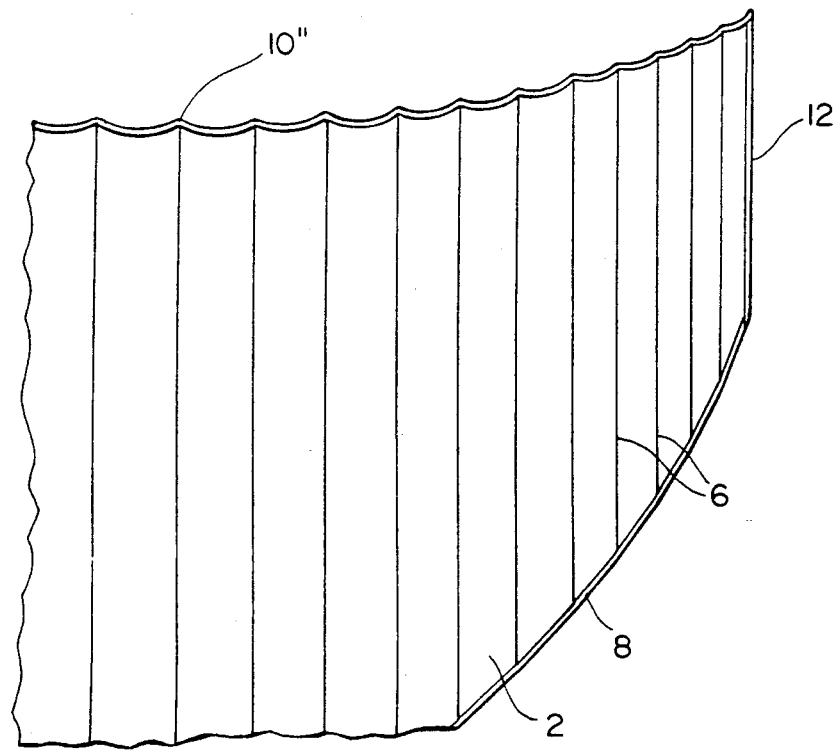
FIG. 5 is a partial perspective view showing a modified embodiment wherein the trailing edge is scalloped.

With reference to FIG. 4, the trailing edge 10' is shown to have some thickness produced by a trailing edge web extending between the upper and lower surfaces and may have openings 20 therein. Such openings and similar arrangements such as vents or perforations, can serve to improve flow in the trailing edge region. Similarly, a scalloped shape of the trailing edge is shown at 10" in FIG. 5, or a sawtooth design can be used, as another way to improve flow in this region. Although such additional shapes and configurations can be used, the basic crescent shaped planform of the invention as described above is still preserved.

Further, planform crescent shapes can be used with curves forming the leading and trailing edges other than ellipses, including curves that cannot be mathematically described. However, the planform in any case is approximately crescent shaped and the density of the ribs and cells increase as the leading edge curvature increases toward the outer side edges. The crescent shaped planform provides a reduction in induced drag and a large improvement in positive stability which allows much higher aspect ratio ram air wings to be built without the penalties normally associated with such wings. The higher aspect ratio further reduces induced drag and accordingly the invention results in superior glide performance.

Figure 3:
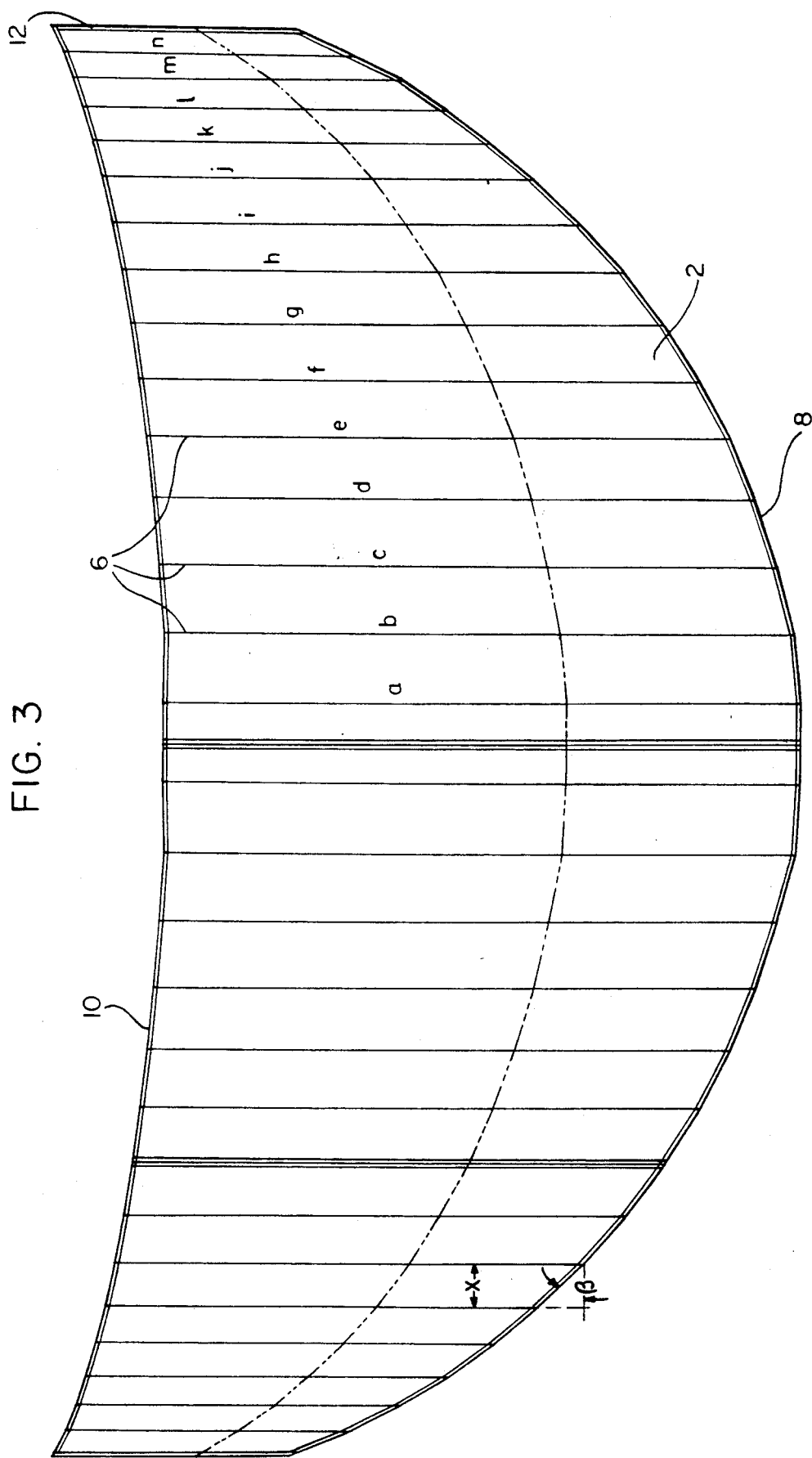
FIG. 3 is a top plan view of the parachute canopy of this invention showing the planform design.

Table I shows approximate dimensions for a practical embodiment of the present invention for manned applications. The lengths of the leading edge major and minor axes are 320 inches and 243 inches, respectively, and the lengths of the trailing edge major and minor axes are 320 inches and 38 inches, respectively. In this table the letters a through n represent the chords 6 as shown in FIG. 3 having different lengths. The cell widths are represented by the spacing between the ribs a-b, b-c, c-d, etc. The length of side edge 12 is also represented as a cord length. The table shows dimensions for one-half of the crescent-shaped planform, but these dimensions are the same for the chord lengths and cell widths on the other half.

TABLE I

| Cell Width (in) | Chord Length (in) |
| --- | --- |
| a-a = 13.9 | a = 103 |
| a-b = 13.6 | b = 102 |
| b-c = 13.4 | c = 101 |
| c-d = 13.1 | d = 100 |
| d-e = 12.8 | e = 98.7 |
| e-f = 12.5 | f = 96.9 |
| f-g = 12.1 | g = 94.9 |
| g-h = 11.7 | h = 92.5 |
| h-i = 10.7 | i = 89.9 |
| i-j = 9.6 | j = 87 |
| j-k = 8.4 | k = 83.95 |
| k-l = 7.7 | l = 80.7 |
| l-m = 7.1 | m = 77.2 |
| m-n = 6.5 | n = 73.7 |
| n-12 = 5.5 | side edge (12) = 69.9 |

While these dimensions are intended to illustrate a preferred canopy configuration for manned applications, numerous variations of wings that are much smaller, and larger in size, or of lesser aspect ratio, or larger, are contemplated for the present invention.

It is to be understood that the foregoing description an accompanying drawings set forth the preferred embodiment of the invention at the present time. Various modifications, additions and alternative designs will, of course, become apparent to those skilled in the art in light of the foregoing teachings without departing from the spirit and scope of the disclosed invention. Therefore, it should be appreciated that the invention is not limited to the disclosed embodiments but may be practiced within the full scope of the appended claims.

I claim:

1. A ram air parachute comprising:
a canopy having an upper surface of flexible material and a lower surface of flexible material spaced from said upper surface; a plurality of shroud lines having upper ends connected to said lower surface at spaced positions thereon; a leading edge on said upper surface and said lower surface having a shape substantially in the form of half of the perimeter of a first ellipse; a trailing edge on said upper surface and said lower surface having a shape substantially in the form of half of the perimeter of a second ellipse curving in the same direction as the leading edge to form a planform shape and having the same major axis as said first ellipse but a shorter minor axis than said first ellipse; a plurality of ribs of flexible material in substantially parallel spaced relationship with respect to each other extending between and connecting together said upper and lower surfaces to form a plurality of cells extending in a longitudinal direction substantially aligned with the direction of motion of the parachute in use; and a gradually decreasing spacing between said ribs in opposite directions extending from a central region of the parachute.

2. A parachute as claimed in claim 1 and further comprising: side edges between said leading and trailing edges remote from said central region in a transverse direction.

3. A parachute as claimed in claim 1 wherein:
said leading edge has an increasing curvature in a direction from and transverse to said central region forming an increasing sweep angle relative to the direction of motion of the parachute when deployed in use; and
said spacing between adjacent ribs is solely a function of the cosine of said sweep angle of a portion of said leading edge between said adjacent ribs so that the density of said ribs and cells increases as said leading edge curvature increases.

4. A ram air parachute comprising: an upper surface of flexible material; a lower surface of flexible material; a central region; side regions remote from and on opposite sides of said central region; a leading edge having an increasing curvature rearwardly from said central region to said side regions; a trailing edge curving in the same direction as the leading edge and having an increasing curvature rearwardly from said central region to said side regions less than said curvature of said leading edge; and a plurality of cells between said surfaces and extending substantially longitudinally between said leading and trailing edges, the density of said cells increasing from said central region to said side regions as said leading edge curvature increases, ribs of flexible material extending between and connecting said upper and lower surfaces, said cells being formed by and having sides comprised of said ribs and said upper and lower surfaces, the spacing between said ribs decreasing as said leading edge curvature increases.

5. A parachute as claimed in claim 4 wherein:
said increasing curvature of said leading edge produces an increasing sweep angle relative to the direction of motion of the parachute when deployed in use; and
said spacing between adjacent ribs is solely a function of the cosine of said sweep angle of a portion of said leading edge between said adjacent ribs so that the density of said ribs increases as said leading edge curvature increases.

6. A ram air parachute comprising a flexible canopy having a crescent shape in planform, said canopy including: a central region; side regions remote from and on opposite sides of said central region; a leading edge having a first curvature extending rearwardly from said central region to said side regions; and a trailing edge curving in the same direction as the leading edge and having a second curvature extending rearwardly from said central region to said side regions less than said first curvature to form said crescent shape.

7. A ram air parachute as claimed in claim 7 and further comprising:
said leading edge having a shape substantial in the form of half of the perimeter of a first ellipse and said trailing edge having a shape substantially in the form of half of the perimeter of a second ellipse having the same major axis as said first ellipse but a shorter minor axis than said first ellipse.

8. A ram air parachute as claimed in claim 7 and further comprising: a central region; side regions on opposite sides of said central region; and a plurality of ram air cells extending side by side across the width of the canopy, the density of said cells increasing as a function of the sweep angle of the leading edge from said central region to said side regions of the canopy.

9. A ram air parachute as claimed in claim, 88 and further comprising:
the width of each ram air cell decreasing as the curvature of said leading edge increases.

* * * * *